(12) United States Patent
Matula

(10) Patent No.: US 9,616,399 B2
(45) Date of Patent: Apr. 11, 2017

(54) METHOD FOR FEEDING CHEMICAL INTO A LIQUID FLOW

(71) Applicant: WETEND TECHNOLOGIES OY, Savonlinna (FI)

(72) Inventor: Jouni Matula, Savonlinna (FI)

(73) Assignee: Wetend Technologies Oy, Savonlinna (FI)

( * ) Notice: Subject to any disclaimer, the term of this patent is extended or adjusted under 35 U.S.C. 154(b) by 630 days.

(21) Appl. No.: 14/100,313

(22) Filed: Dec. 9, 2013

(65) Prior Publication Data

US 2014/0177380 A1  Jun. 26, 2014
US 2016/0367956 A9  Dec. 22, 2016

Related U.S. Application Data

(62) Division of application No. 10/574,694, filed as application No. PCT/FI2004/000586 on Oct. 5, 2004, now Pat. No. 8,602,634.

(30) Foreign Application Priority Data

Oct. 8, 2003 (FI) ..................................... 20031468

(51) Int. Cl.
  *B01F 5/04* (2006.01)
  *B01F 15/02* (2006.01)
  (Continued)

(52) U.S. Cl.
  CPC ........ *B01F 15/0254* (2013.01); *B01F 3/0865* (2013.01); *B01F 5/0405* (2013.01); *B01F 5/0471* (2013.01); *B01J 4/002* (2013.01); *B01J 4/008* (2013.01); *B05B 7/0408* (2013.01); *B05B 7/10* (2013.01); *D21H 23/04* (2013.01)

(58) Field of Classification Search
  CPC .... B01F 3/0865; B01F 5/0405; B01F 5/0471; B01F 15/0254; B01J 4/008; B01J 4/002; D21H 23/04; B05B 7/10; B05B 7/0408
  USPC ......... 366/178.1–178.3, 167.1, 173.1, 173.2, 366/174.1, 175.2; 239/416.1, 416.4,
  (Continued)

(56) References Cited

U.S. PATENT DOCUMENTS 154,544 A   9/1874 Doten
371,158 A  10/1887 Wright
(Continued)

FOREIGN PATENT DOCUMENTS

EP  0 050 312  4/1982
FR    952711  11/1949
(Continued)

OTHER PUBLICATIONS

International Search Report mailed Jan. 25, 2005.
Applicant's Response to International Search Report and First Written Opinion in PCT/FI2004/000586 (May 6, 2005).

*Primary Examiner* — Charles Cooley
(74) *Attorney, Agent, or Firm* — Nixon & Vanderhye P.C.

(57) ABSTRACT

A method to feed a chemical into a liquid flow using a feed device including a nozzle casing having an isolated mixing space including: feeding the chemical to the isolated mixing space in the feed device; feeding a mixing liquid to the isolated mixing space; mixing the chemical and the mixing liquid in the isolated mixing space to form a mixture of chemical and mixing liquid, and feeding the mixture of chemical and mixing liquid to the liquid flow.

18 Claims, 3 Drawing Sheets

(51) Int. Cl.
  *B01F 3/08* (2006.01)
  *B01J 4/00* (2006.01)
  *B05B 7/04* (2006.01)
  *B05B 7/10* (2006.01)
  *D21H 23/04* (2006.01)

(58) Field of Classification Search
  USPC ......... 239/416.5, 419.5, 420, 423, 424, 425, 239/433, 434.5
  See application file for complete search history.

(56) References Cited

U.S. PATENT DOCUMENTS

| | | | |
|---|---|---|---|
| 857,496 A | 6/1907 | Stream et al. | |
| 945,143 A * | 1/1910 | Szamek | B01F 3/0865 137/889 |
| 1,422,907 A | 7/1922 | Wilkinson | |
| 1,447,770 A | 3/1923 | Egle | |
| 1,570,951 A | 1/1926 | Downing | |
| 1,938,708 A | 12/1933 | McCutcheon | |
| 2,393,887 A * | 1/1946 | Clements | F23D 11/102 239/416.1 |
| 2,563,002 A | 8/1951 | Bissell et al. | |
| 2,613,737 A | 10/1952 | Schwietert | |
| 2,831,754 A | 4/1958 | Manka | |
| 3,153,438 A | 10/1964 | Brzozowski | |
| 3,332,442 A | 7/1967 | Reed | |
| 3,460,765 A * | 8/1969 | Lord | B01F 15/0261 137/315.19 |
| 3,818,938 A * | 6/1974 | Carson | B01F 5/0405 239/427.5 |
| 3,866,886 A | 2/1975 | Thorne et al. | |
| 4,148,437 A | 4/1979 | Barker et al. | |
| 4,526,322 A | 7/1985 | Voorheis | |
| 4,549,813 A | 10/1985 | Volz et al. | |
| 4,662,759 A | 5/1987 | Leibee et al. | |
| 4,749,554 A | 6/1988 | Proksa et al. | |
| 4,917,502 A | 4/1990 | Proksa et al. | |
| 4,951,713 A | 8/1990 | Jordan et al. | |
| 5,171,090 A | 12/1992 | Wiemers | |
| 5,681,162 A | 10/1997 | Nabors et al. | |
| 5,725,306 A * | 3/1998 | Kappel | B01F 7/00758 241/261.2 |
| 6,387,247 B1 * | 5/2002 | Chen | B01J 8/1827 208/113 |
| 6,659,636 B1 * | 12/2003 | Matula | B01F 3/0865 366/165.1 |
| 7,234,857 B2 | 6/2007 | Matula | |
| 7,434,982 B2 | 10/2008 | Nagasawa et al. | |
| 7,758,725 B2 | 7/2010 | Matula | |
| 7,762,061 B2 | 7/2010 | Birkby et al. | |
| 8,083,395 B2 | 12/2011 | Etzenbach | |
| 8,602,634 B2 * | 12/2013 | Matula | B01F 3/0865 239/416.4 |
| 9,486,762 B2 * | 11/2016 | Lah | B01J 4/002 |
| 2002/0131325 A1 | 9/2002 | Matula | |
| 2005/0007872 A1 | 1/2005 | Nagasawa et al. | |
| 2005/0036921 A1 | 2/2005 | Nagasawa et al. | |
| 2007/0251888 A1 * | 11/2007 | Matula | B01F 5/0206 210/752 |
| 2007/0258315 A1 * | 11/2007 | Matula | B01F 3/0865 366/134 |
| 2007/0258316 A1 | 11/2007 | Matula | |
| 2008/0230194 A1 | 9/2008 | Matula | |
| 2008/0267006 A1 | 10/2008 | Moreira Campos | |
| 2011/0226432 A1 | 9/2011 | Matula | |
| 2011/0259971 A1 | 10/2011 | Askin et al. | |
| 2012/0255620 A1 * | 10/2012 | Matula | B01F 5/0206 137/1 |
| 2013/0000858 A1 | 1/2013 | Rasanen et al. | |
| 2015/0049575 A1 * | 2/2015 | Matula | B01F 3/0865 366/173.1 |
| 2016/0038897 A1 * | 2/2016 | Matula | B01F 5/0405 366/182.2 |
| 2016/0263537 A1 * | 9/2016 | Kenreck, Jr. | B01F 5/0461 |

FOREIGN PATENT DOCUMENTS

| | | |
|---|---|---|
| FR | 1453925 | 7/1966 |
| JP | 56-95324 | 8/1981 |
| WO | 99/43887 | 9/1999 |
| WO | WO 9943887 A1 * | 9/1999 ............ B01F 3/0865 |

* cited by examiner

METHOD FOR FEEDING CHEMICAL INTO A LIQUID FLOW

This application is a divisional application of U.S. patent application Ser. No. 10/574,694 filed Mar. 5, 2007, now U.S. Pat. No. 8,602,634 which is a U.S. national phase of international application PCT/FI2004/000586 filed 5 Oct. 2004 which designated the U.S. and claims benefit of Finnish Application No. 20031468 filed 8 Oct. 2003, the entire contents of each are hereby incorporated by reference.

BACKGROUND

The present invention is related to a method and apparatus for feeding chemical into a liquid flow. The method and apparatus of the invention are particularly well applicable to feeding of very small chemical volumes in precise amounts into large process liquid flows.

Naturally, there is practically an innumerable amount of prior art methods of feeding various chemicals into liquid flows. However, these methods may be divided into a few main categories as can be seen from the following. Firstly, it is quite possible to just let the liquid to be added flow freely into a second liquid without employing any special regulation or mixing means. This method of adding cannot be employed in situations where the mixing ratio or the uniformity of the mixing is important. Neither can it be employed in situations where the price of the chemical to be added is of significance.

The next applicable method is to feed the chemical in a precise ratio to the liquid flow, whereby correct and economical dosage is obtained. However, even in this case one has to take into account that usually the dosage of the chemical is slightly excessive compared to the optimal dosage, because the mixing is known to be inadequate. The mixing may be improved, though, by feeding the chemical, e. g., through a perforated wall of a flow channel, whereby at least the chemical to be mixed may be spread throughout the entire liquid flow. As the last example, a situation may be discussed, where the chemical is fed in a precise proportion either into the liquid flow upstream of the mixer or through the mixer itself. In that case, the efficiency of the mixing of the chemical into the liquid flow is totally dependent on the mixer design.

Finnish patent no. 108802 discusses as an essential case of mixing related to paper manufacture the mixing of a retention aid into fiber suspension flowing to the head box of a paper machine. In paper manufacture, retention chemicals are used especially in order to improve the retention of fines at the wire section of a paper machine. In the Finnish patent mentioned the mixing device is in fact a conical nozzle with an inlet for the retention chemical. The mixing device is functioning and efficient both in the mixing of retention chemicals and other chemicals in the short circulation of a paper machine and also in other applications in the paper and pulp industry. However, it has been noticed in connection with some applications that various solid substances carried with the feed and/or dilution liquid tend to accumulate in the device. In other words solid material tends accumulate in the device parts converging in the flow direction, which gradually harms the flow profile, the flow itself and in the end tends to clog the device. FI patent application no. 20021350 describes a self-cleaning chemical feed nozzle. In other words when the nozzle starts to become clogged a change take place in its flow conditions which causes a reaction of the nozzle to open wider the cross-sectional flow area of the flow channel in which the solid material in question flows with the fiber suspension; as a result of this the solid particles attached to the channel can get loose from the nozzle and flow on.

In this kind of applications, i. e. feeding for example retention chemicals into a fiber suspension, the mixing devices and the nozzles described in the publications mentioned work well but in cases where only very small amounts of chemicals are needed in relation to the suspension flow to be fed, the operation of the these nozzles is not the best possible for example because they cannot guarantee an adequately homogenous mixing of the chemical into the process liquid flow because of the small volume of the chemical.

SUMMARY

In order to solve, among other things, the problem described above, a new type of a chemical feeding device has been developed the structure of which is very favorable in feeding small chemical amounts into a liquid flow. The feeding device according to the invention includes a thin pipe-like duct disposed preferably inside the feeding device/nozzle so that the desired amount, in this case as small an amount as possible, of chemical can be mixed evenly into the process liquid flow. The pipe-like duct feeding the chemical supplies the chemical into a special nozzle of the feeding device which is preferably designed to have a kind of an isolated mixing space where the chemical and mixing liquid supplied to the feeding device through an inlet of its own are mixed and from which they only after this mixing are fed through openings in the mixing space at first into the feeding liquid and after that aided by the feeding liquid mentioned to the flowing process liquid. The mixing and the dilution of the chemical to a chemical solution before it is fed to the process liquid flow pipe ensure uniform mixing of the chemical into the process liquid. As a result of this, the volume of the chemical to be fed into the feeding device can be of the order of even less than half a percent of the rest of the liquids supplied into the feeding device, which are the mixing liquid and the feeding liquid supplying the mixing liquid and the chemical into the liquid flow. If desired, several feeding devices according to the invention instead of one, may be disposed in connection with the process liquid flow duct.

The structure of the feeding device according to the invention, more precisely expressed the isolated mixing space provided at the end of the mixing liquid feed pipe, improves the mixing of the chemical also in another way. When hitting the wall of the isolated mixing space the liquid chemical is "dispersed" evenly to the whole interior of the isolated mixing space of the nozzle and is mixed and diluted more homogenously into the mixing liquid. In addition to this structure the feeding device can further include a kind of an additional counter piece which, when disposed in the middle of the mouth of the pipe-like duct feeding the chemical, further improves the mixing to the other liquids to be fed and further to the liquid flow to be fed The chemical can be fed into the feeding device according to the invention without separate dilution. In other words the dilution takes place with the mixing liquid in the isolated mixing space of the feeding device. This solution dispenses among other things with the need to use separate dilution vessels, reduces the consumption of fresh water and thus reduces the operation and maintenance costs. On the other hand, it is possible also to dilute the chemical before it is supplied to the feeding device if so desired.

The feeding device according to the invention may be used for example in the feeding of chemicals, such as for example TiO2, optical brighteners, paper dyes and silicates, into the flowing process liquid, only to mention a few chemicals. Thus the feeding device according to the invention is applicable in all processes into which the chemicals mentioned must be supplied, in particular when the amount of the chemical is very little compared with the total flow of suspension flowing to the process. As advantageous examples, only, of the processes may be mentioned for example fiber suspension flows of paper mills, thickening processes of various sludges, recycling fiber processes, bleaching processes and in general processes where feeding of chemical in particular in very small amounts into filtrate, fiber suspension, sludge or the like is necessary.

The mixing device according to the invention allows using as the feeding liquid with which the chemical is supplied into the process liquid, for example into fiber suspension, the same fiber suspension into which the chemical is to be fed. Of course also more dilute suspensions, various filtrates or corresponding or mere fresh water can be used as the feeding liquid in the feeding device of the publication. The mixing liquid may also be any liquid from the process itself of fresh water. Thus all the liquid obtained from another process stage that can be used in the feeding of the chemical, saves at the same time fresh water and thus for example reduces the consumption of fresh water of the mills.

Other characteristic features of the method and the feeding device of the invention are disclosed in the appended patent claims.

DESCRIPTION OF THE DRAWINGS

In the following, the method and the apparatus according to the invention are disclosed in more detail with reference to the appended figures, where.

DETAILED DESCRIPTION

Figure 1:
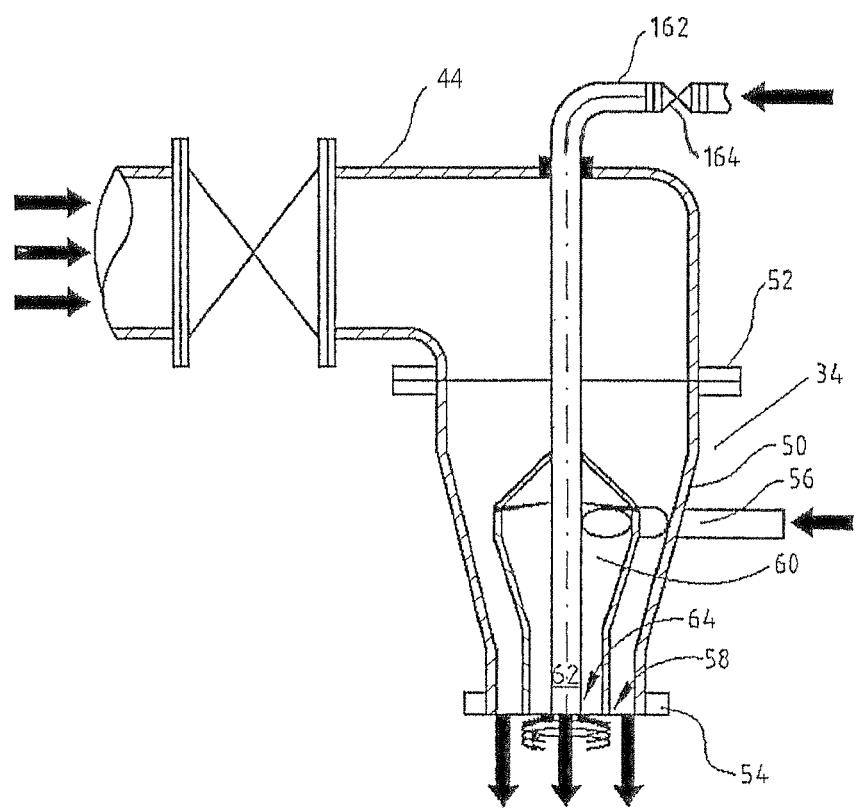
FIG. 1 illustrates a prior art chemical feeding apparatus.

FIG. 1 illustrates schematically a mixing device according to a preferred embodiment of FI patent no. 108802. The mixing apparatus 34 according to FIG. 1 is, in fact, a nozzle comprising preferably an essentially conical casing 50, flanges 52 and 54 arranged into it and preferably, but not necessarily, placed at its opposite ends, and a conduit 56 for the retention chemical. The mixing apparatus 34 is connected by a flange 52 to a dilution medium pipe 44 and by a flange 54 to a fiber suspension flow duct. In the arrangement according to the figure, the casing 50 of the mixing apparatus 34 is converging from the flange 52 towards the flange 54, an opening 58 of the mixing apparatus being located inside the flange 54. The purpose of the conical form of the casing 50 is to accelerate the medium flow in the mixing apparatus 34 so that the velocity of the jet discharging from the mixing apparatus 34 into the fiber suspension flow is at least five times the velocity of the fiber suspension flow. In the embodiment according to the figure, the retention chemical feeding conduit 56 is preferably tangential in order to ensure that retention chemical discharging through the opening 58 of the mixing apparatus 34 into the fiber suspension flow is distributed homogeneously at least on the whole periphery of the opening 58. Inside the mixing apparatus 34 there is a hollow member 60 arranged centrally inside the mixing apparatus 34, into which member the retention chemical is guided from the conduit 56. In other words, the conduit 56 pierces the conical wall 50 of the mixing apparatus 34 and further leads via the annular space between the cone 50 and the member 60 into the member 60, at the same time preferably carrying the member 60 in its place. The member 60 is pierces in the axial direction by a hole 62, into which mixing liquid is brought via a valve 164 and a duct 162; thus the mixing liquid can flow from inside the chemical flow to the fiber suspension flow duct. The retention chemical flow guided tangentially into member 60 turns in the form of a spiral flow towards the opening 58 of the mixing apparatus, where there is at the lower end of the member 60 (according to the figure) an annular opening 64 for the retention chemical, wherefrom the retention chemical is discharged as a fan-shaped jet into the fiber suspension together with the feed liquid discharging from outside the opening 64 and the mixing liquid discharging from the inside of the opening 64 through the hole 62. The figure clearly shows that the retention chemical is not in any contact with the mixing liquid before it is discharged through the opening 64 into the fiber suspension flow duct.

Figure 2:
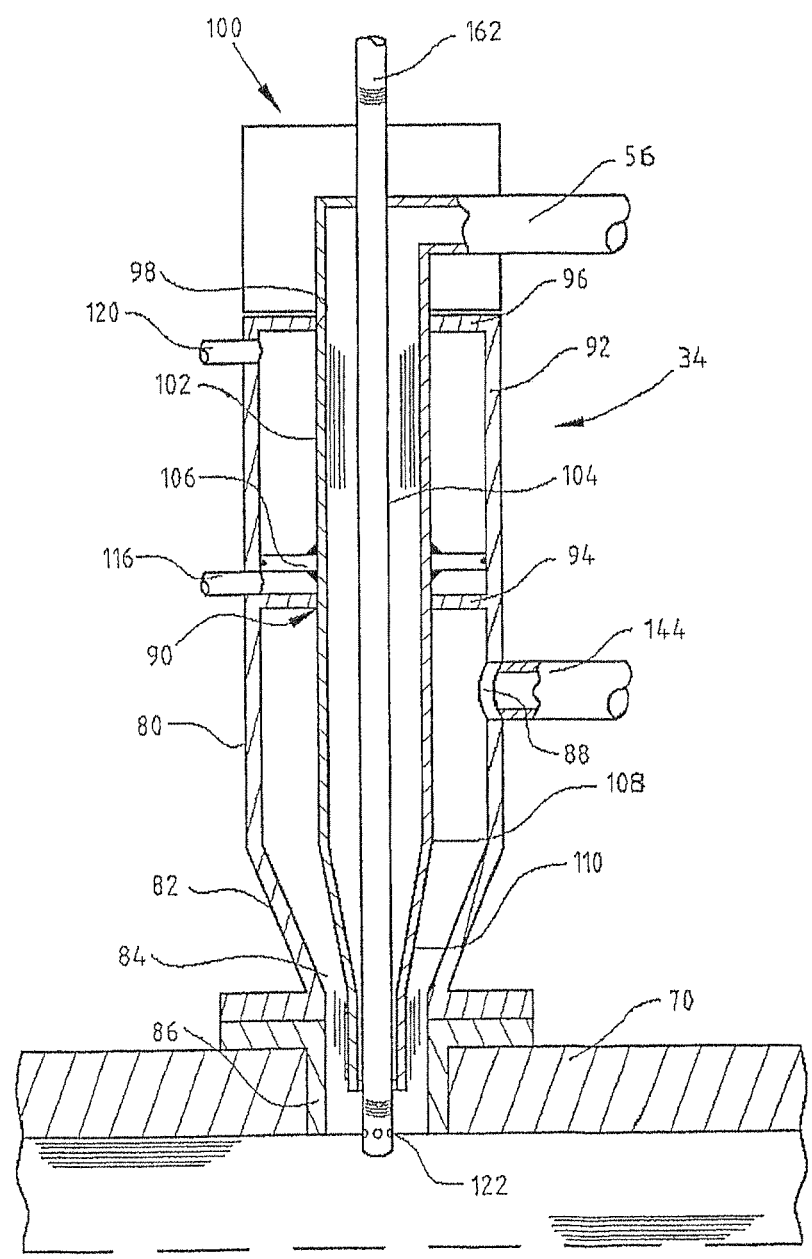
FIG. 2 illustrates an other prior art chemical feeding apparatus.

FIG. 2 illustrates another prior art feed nozzle 34. It comprises, starting from the bottom of the figure, in other words from the liquid flow duct 70, an essentially cylindrical nozzle casing 80 the end of which facing the liquid flow duct has a conically converging portion 82. The converging portion 82 ends at a central feed opening 84, which continues to the direction of the flow duct 70 in apparatus 86 for attaching the feed nozzle 34 to the liquid flow duct 70. The side wall of the nozzle casing 80, preferably the cylindrical portion thereof, has been provided with an opening 88 communicating with a feed liquid duct connection 144 for supplying feed liquid into the mixing nozzle 34. The end of the nozzle casing 80 opposite the flow duct 70 has been provided with a round central opening 90 and with a pressure medium cylinder 92 forming an extension of the nozzle casing 80 while the other end of the pressure medium cylinder 92 is the end 94 of the nozzle casing located opposite the flow duct. At the opposite end of the pressure medium cylinder 92 there is an end plate 96 with a central round opening 98 like in the upper end of the nozzle casing 80.

Both chemical and mixing liquid feed apparatus 100 extend to the nozzle casing 80 from above through the openings 98 and 90 in the ends 96 and 94 mentioned above. These feed apparatus include among other things a chemical feed duct 102 which has a flow connection with the chemical conduit 56 and a mixing liquid feed duct 104 which in turn communicates with a mixing liquid feed conduit 162, which in this embodiment is located centrally inside the chemical feed duct 102; the feed ducts 102 and 104 being attached to each other at the upper end. The chemical feed duct 102 is preferably cylindrical for the most of its length as in this embodiment it functions at the same time as a piston rod of the pressure medium cylinder 92. A piston disc 106 sealed relative to the pressure medium cylinder 92 and secured to the outer surface of the chemical feed duct 102 has been provided to serve as the piston itself. Naturally both the ends 94 and 96 of the pressure medium cylinder 92 have been provided with suitable sealing to ensure the operation of the cylinder.

The chemical feed duct 102 has at the lower end of it, in other words at the end facing the fiber suspension flow duct 70 and extending inside the nozzle casing 80, a conical converging portion 108 which is essentially located at the conical portion 82 of the nozzle casing 80 and the coning angle is of the same order as that of the conical converging portion 82 of the nozzle casing 80. The mixing liquid feed duct 104 in turn runs centrally inside the chemical feed duct 102 and extends to a distance outside the conical converging portion 108 of the chemical feed duct 102. The figure further illustrates how the chemical feed duct 102 continues as a cylindrical nozzle duct 110 after the converging portion 108 so that a narrow slot is created between the wall of the mixing liquid feed duct 104 and the nozzle duct 110; in the slot the velocity of the chemical flow is increased to the required level for feeding to the fiber suspension flow.

In the normal state the feed nozzle is in the operation position illustrated in FIG. 2; thus both the nozzle duct 110 of the chemical feed duct 102 and openings 122 in the mixing liquid feed duct 104 are located outside the nozzle casing 80 essentially to the level of the wall of the fiber suspension flow duct. In the flushing position the pressure medium supplied to the pressure medium cylinder 92 via the opening 116 moves the chemical and mixing liquid feed apparatus 100 by means of the piston disc 106 upwards so that the distance between the conical portions 82 and 108 increases and the end 118 of the mixing liquid feed duct 104 rises so high that the feed liquid flow flushes all impurities or solid particles via the opening 84 from between the conical portions to the fiber suspension flow duct.

After a certain time, preferably the flushing time is about 1-6 seconds, pressure medium is fed to the cylinder from the opening 120 in the opposite end of the pressure medium cylinder 92, and the piston disc 106 presses the chemical and mixing liquid feed apparatus 100 back to the operation position. The function described above is guided either by pressure, the pressure difference or volume flow of the feed liquid.

Figure 3:
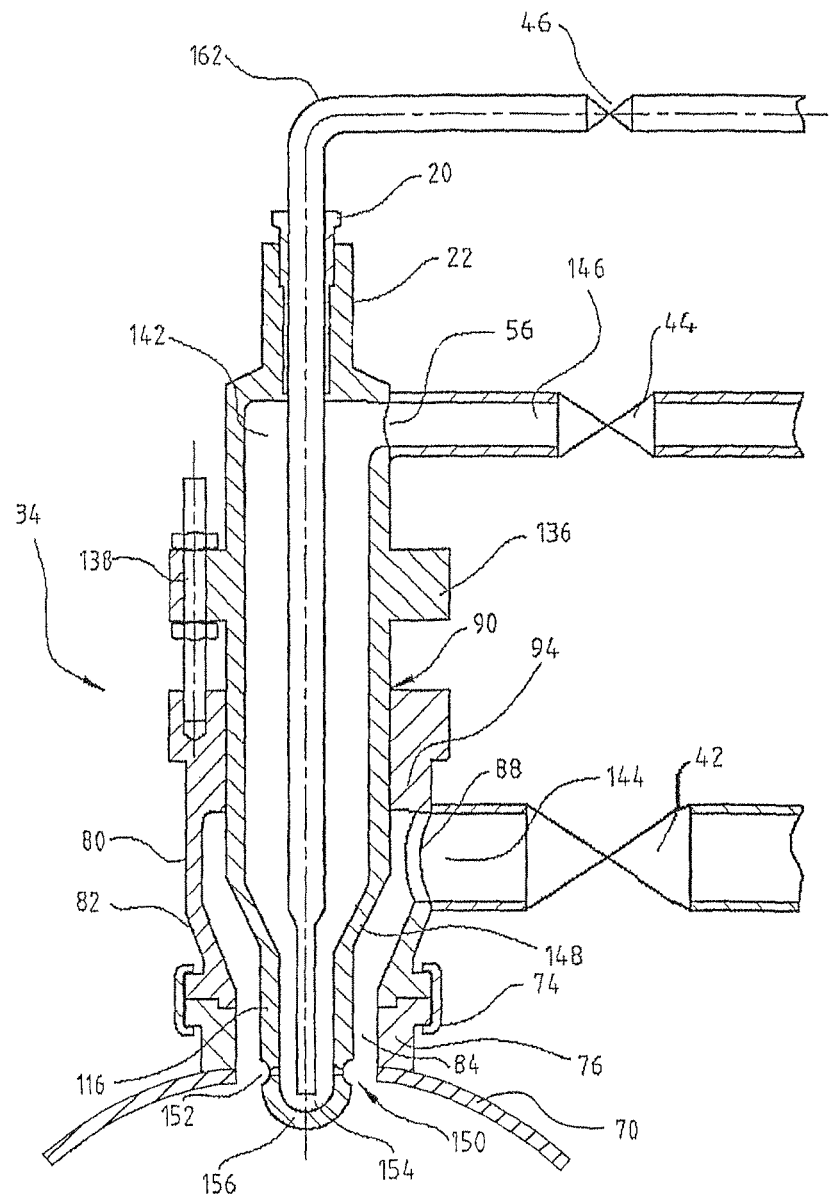
FIG. 3 illustrates chemical feeding apparatus according to a preferred embodiment of the present invention.

FIG. 3 illustrates a preferred embodiment of the feed apparatus, i. e., feed nozzle 34, of the present invention. It comprises, starting from the bottom of the figure, in other words from the liquid flow duct 70, an essentially cylindrical nozzle casing 80 the end of which facing the liquid flow duct has a conically converging portion 82. The converging portion 82 ends at a central feed opening 84, which continues to the direction of the flow duct 70 in apparatus 74 and 76 for attaching the feed nozzle 34 to the liquid flow duct 70. The side wall of the nozzle casing 80, preferably the cylindrical portion thereof, has been provided with an opening 88 communicating via a duct 144 and a valve 42 with the feed liquid feed duct for supplying feed liquid into the feed nozzle 34.

A mixing liquid feed duct 142 forms together with a chemical feed duct 162 the cylindrical upper portion of the feed apparatus 34. Both the feed ducts 142 and 162 extend inside the nozzle casing 80 up to the liquid flow duct 70. The location of the end of the feed ducts is adjustable in relation to the liquid flow duct 70 so that the end of the ducts extends preferably inside the flow duct. The end of the nozzle casing 80 opposite the flow duct 70 is provided with an end part 94 having a round central opening 90 for the feed duct 142. The upper portion formed by the feed duct 142 is provided with a flange 136 and a movable screw/nut connection 138 or a corresponding member by means of which the upper portion (feed duct 142) and the lower portion (nozzle casing 80) of the feed apparatus 34 are attached to each other. In addition to feature that the parts 136 and 138 secure the upper and the lower portions to each other the adjustable screw 138 may be used for adjusting the position of the mixing liquid 142 and the chemical feed duct 162 of the feeding device 34 in relation to the liquid flow duct 70.

The adjustability of the feed device 34 and the structure of securing means 74 and 76 allow the use of the feed device 34 with process liquid ducts 70 of various thicknesses, in other words the device can be secured to these ducts.

The side wall of the feed duct 142, preferably the cylindrical portion thereof, at a location outside the end parts 94 and 136, the nozzle casing 80 and the feed liquid feed opening 88 as seen from the flow duct 70, has been provided with an opening 56 for the mixing liquid to be fed to the feed device 34. The feed opening 56 communicates via a mixing liquid conduit 146, which in this embodiment is preferably tangential in relation to the feed device 34, and an adjustable valve 44 with the mixing liquid feed pipe for supplying mixing liquid into the feed device 34.

The chemical feed duct 162, which is preferably a very thin pipe for feeding small chemical volumes, extends in this embodiment of the invention to the feed device 34 from above. The feed duct 162 is also in this embodiment bent at a location above the feed device 34 to the same direction as the connections 144 and 146 for feed and mixing liquids. The volume of the chemical to be fed may be adjusted for example with a valve 46 located in the chemical feed duct 162. The chemical feed duct 162 has been secured to an elongate outer end 22 of the feed device 34 with a securing means 20.

The feed duct 162 communicates with the mixing liquid feed duct 142 by being located in this embodiment centrally inside the mixing liquid feed duct 142 and extending close to the special nozzle part 150 of the feed duct 142 which nozzle part in turn is adjustable to extend inside the process liquid flow duct 70.

In this embodiment of the invention the mixing liquid feed duct 142 has at the lower end of it, in other words at the end facing the fiber suspension flow duct 70 and extending inside the nozzle casing 80, a conical converging portion 148 which is essentially located at the conical portion 82 of the nozzle casing 80 and its coning angle is of the same order as that of the conical converging portion 82 of the nozzle casing 80. The conical converging portion 148 of the mixing liquid feed duct 142 does not extend quite to the lower end of converging portion 82 for the feed liquid but the feed duct continues preferably as a cylindrical duct 116 inside the feed opening 84 whereby the cross-sectional flow area between these parts reduces in the flow direction caused an increasing in the flow velocity of the feed liquid. The flow velocity of the mixture of the chemical to be fed into the process liquid flowing in the process liquid flow duct 70 and the feed liquid is at the feed moment at least five times the speed of the process liquid flow.

The cylindrical duct 116 at the lower end of the mixing chemical feed duct 142 ends at the nozzle part 150 which provides the mixing space 154 isolated from the feed liquid and the flowing process liquid required for the chemical mixing and from which the chemical solution (a mixture of chemical and mixing liquid) is at first fed via openings 152 to the feed liquid flow and further by means of the feed liquid in an even flow to the liquid flow duct 70. The isolated mixing space 154 in the nozzle part 150 is formed for example of a cup-like "closed" end 156 of the mixing liquid flow duct 142 and of the openings 152 provided at its sides. The closed end 156 is impervious to the flow of liquid. The openings 152 have been provided in the wall of the flow duct 142 above the mixing space 154 of the nozzle part 150. Via the openings 152 the mixing liquid and the chemicals mixed into it are discharged practically in a radial fan-like flow to the feed liquid. The openings 152 may have a round, angular or for example slot-like configuration only to mention a few examples. The thin pipe-like chemical feed duct 162 extends to the end 156 of the nozzle part 150, preferably past the openings 152. This embodiment guarantees a good chemical mixing result as the chemical jet hits the end of the nozzle part 150 and is from there dispersed evenly to the entire mixing liquid volume and further via openings 152 to the liquid flow duct 70. The mixing and the dilution of the chemical thus take place before the feeding to the process liquid by means of the feed liquid. This ensures that precise chemical amounts are mixed into the whole cross-sectional flow area of the process liquid. According to another preferred embodiment of the invention a kind of an additional, for example conical, counter piece has been provided, if necessary, in the end of the chemical feed duct 162 quite in the center of it whereby, when hitting it, the chemical jet is dispersed and mixed even more efficiently. Another alternative is to design the end cup 156 of the duct 142 so that it divides the chemical flow coming from the duct 162 evenly to different sides of the duct 162 for example by providing the bottom of the end cup at a central position relative to the duct 162 with a conical or corresponding bulge converging towards the duct.

Preferably the nozzle part 150 of the mixing liquid flow duct 142 and the mixing space therein are located inside the process liquid flow duct 70 or at least in the close vicinity of the inner surface of the flow duct 70 mentioned so that the mixing of the chemical to the mixing liquid takes place 0.5 seconds, at the most, before the chemical solution is mixed with the process liquid. Compared with the situation illustrated in FIG. 3, where the openings 152 are located just inside the wall of the process liquid flow duct 70 (illustrated schematically), the openings 152 may be located at the annular feed opening 84 for feed liquid, thus inside the duct portion 76.

The function of the feed liquid discharging from the opening 84 of the feed device 34 is to give the chemical solution the required velocity which feeds the chemical solution efficiently across the whole cross-sectional flow area of the liquid flow duct 70. The feed liquid hits mainly axially the chemical solution jet discharging from the openings 152 in an almost radial direction, increasing the velocity of the chemical and improving the mixing with the process liquid flowing in the flow duct 70. The direction and penetration of the chemical jet are adjusted by adjusting the feed device 34 with the screw 138 and the feed pressure with valves 42, 44 and 46.

As may be seen from the above, a feeding device of a new type for feeding and mixing various chemicals in small, precisely predetermined amounts to process liquid flows has been developed. It should also be noted that although the above description generally discusses the use of the feed nozzle according to the invention particularly in connection with applications in wood processing industry the invention may be applied anywhere where chemicals need to be fed and mixed into a medium flow evenly and in precise amounts. Thus, the field of application and the scope of protection of the invention are defined by the appended patent claims, only.

The invention claimed is:

1. A method to feed a chemical into a liquid flow using a feed device including a nozzle casing having an isolated mixing space, said method comprising:
    feeding the chemical to the isolated mixing space in the feed device, wherein the nozzle casing is disposed at least partially in the liquid flow;
    feeding a mixing liquid to the isolated mixing space;
    mixing the chemical and the mixing liquid in the isolated mixing space to form a mixture of chemical and mixing liquid,
    feeding the mixture of chemical and mixing liquid to the liquid flow, and
    wherein the mixture of chemical and mixing liquid is introduced into a feed liquid before being fed to the liquid flow.

2. A method according to claim 1, wherein the chemical is mixed with the mixing liquid less than 0.5 seconds before the mixture of chemical and mixing liquid is fed to the liquid flow.

3. A method according to claim 1, further comprising feeding the chemical and the mixing liquid to the isolated mixing space through separate flow paths including one flow path disposed inside of another flow path.

4. A method according to claim 1, wherein the feed liquid includes a liquid extracted from the liquid flow.

5. A method according to claim 1, further comprising adjusting the mixing of the chemical with the mixing liquid by changing a position of the isolated mixing space in relation to a duct for the liquid flow and to which the nozzle casing is connected.

6. A method according to claim 1, wherein the chemical includes at least one of $TiO_2$, optical brighteners, paper dyes and silicates.

7. A method according to claim 1 wherein the mixing liquid includes fresh water.

8. A method according to claim 1 wherein the mixing liquid includes a circulation liquid extracted from the liquid flow.

9. A method according to claim 8 wherein the liquid flow includes a fiber suspension.

10. A method to feed a chemical into a liquid flow using a feed device including a nozzle casing including an isolated mixing space, a closed end proximate to the isolated mixing space, a chemical feed duct having a outlet at the isolated mixing space and a mixing liquid feed duct in fluid communication with the isolated mixing space, said method comprising:
    feeding the chemical through the chemical feed duct and discharging the chemical from the outlet into the isolated mixing space;
    feeding the mixing liquid through mixing liquid feed duct to the isolated mixing space;
    mixing the chemical and the mixing liquid in the isolated mixing space to form a mixture of chemical and mixing liquid, wherein the mixing in the isolated mixing space is impervious to the liquid flow,
    feeding the mixture of chemical and mixing liquid from the isolated mixing space to the liquid flow, wherein at least a portion of the closed end extends into the liquid flow, and
    wherein the nozzle casing includes a feed liquid duct having an opening to the liquid flow, and wherein the feeding of the mixture includes discharging the mixture from the isolated mixing space into feed liquid flowing through the feed liquid duct and through the opening into the liquid flow.

11. The method of claim 10 wherein the feeding of the mixture includes passing the mixture through an opening in the mixing liquid feed duct.

12. The method of claim 11 wherein the opening is offset from the outlet along the axis of the mixing liquid feed duct.

13. The method of claim 10 wherein the chemical feed duct is contained within and coaxial to the mixing liquid feed duct, and the feeding of the mixing liquid and the feeding of the chemical flow in parallel to the isolated mixing space.

14. The method of claim 10 wherein a velocity of the feed liquid flowing through opening in the feed liquid duct causes the mixture in the feed liquid to disperse across an entirety of a cross-section of the liquid flow.

15. The method of claim 10 wherein the feeding of the mixture from the isolated space to the liquid flow occurs within one-half of a second of the mixing of the chemical with the mixing liquid.

16. The method according to claim 10 further comprising adjusting the mixing of the chemical with the mixing liquid by changing a relative position of the isolated mixing space in relation to a duct for the liquid flow and to which the nozzle casing is connected.

17. The method according to claim 10, wherein the chemical includes at least one of $TiO_2$, optical brighteners, paper dyes and silicates.

18. The method according to claim 10 wherein the liquid flow includes a fiber suspension.

\* \* \* \* \*